Aug. 15, 1967     N. BROZOVICH     3,336,037

VEHICLE AND PROPELLING MEANS

Filed May 2, 1966

*INVENTOR*
NICHOLAS BROZOVICH

BY *Eugene M. Bond*

*ATTORNEY*

United States Patent Office 3,336,037
Patented Aug. 15, 1967

3,336,037
VEHICLE AND PROPELLING MEANS
Nicholas Brozovich, 615 Birch St.,
Boonton, N.J. 07005
Filed May 2, 1966, Ser. No. 546,824
9 Claims. (Cl. 280—12.14)

This invention relates to a land vehicle having a new improved propelling means. More particularly, the present invention relates to a land vehicle having a manual or motor-propelled wheel which intermittently engages the ground surface for moving the vehicle over surface obstructions or irregularities while otherwise continuously engaging the ground surface during the non-propelling or coasting of the vehicle.

Various land vehicle propelling means are available to the art for propelling vehicles along the ground surface. Typically, these propelling means are in constant contact with the ground surface and in the absence of special linkages, the propelling means offer substantial resistance to the free coasting of the vehicle when the vehicle is not being propelled. According to the present invention, however, there is provided a new improved propelling wheel which usefully propels the vehicle when desired and which is removed from vehicle-propelling ground contact when the vehicle is freely coasting.

It is an object of this invention, therefore, to provide a new improved propelling wheel for land vehicles.

It is also an object of this invention to provide a propelling wheel having a runner for ground engagement during the non-propelling or coasting of the vehicle.

It is another object of this invention to provide a sled or like vehicle having a propelling wheel mounted such that the wheel may propel the vehicle over surface obstructions or irregularities while otherwise engaging the ground surface by a runner during the non-propelling or coasting of the vehicle.

It is yet another object of this invention to provide a sled or the like having a new improved propelling wheel which is simple in construction and highly practical to manufacture and use.

These and other objects and advantages of the present invention will appear in the following detailed description of the invention taken with the drawing in which.

It will be apparent that in the description of the invention like elements will be referred to by like numerals throughout the explanation of the several views.

Generally described, the present invention is directed to a new improved propelling wheel for use in combination with a land vehicle which comprises a frame, steering means, ground contact runners or wheels, and propelling-wheel engaging and operating means.

Figure 2:
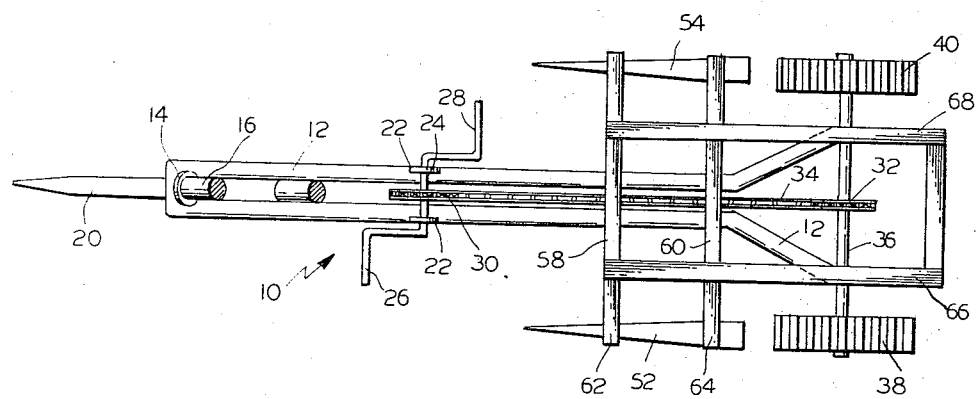
FIG. 2 is a top-elevational view taken along section lines A—A of the land vehicle of FIG. 1.
Figure 1:
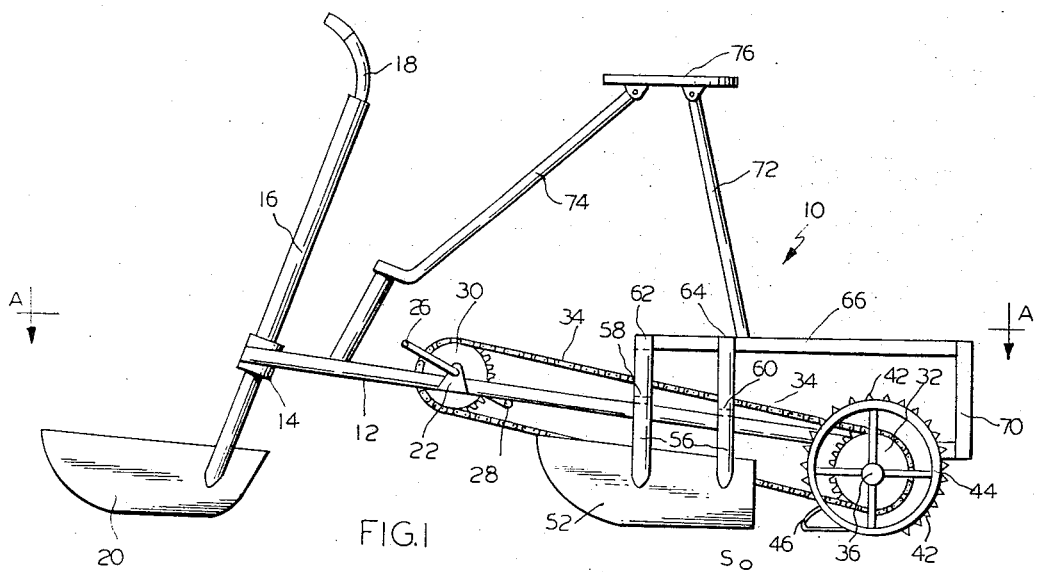
FIG. 1 illustrates a land vehicle, taken as a side-elevational view, including the new and improved propelling means of the present invention.

Referring to the drawing, FIGS. 1 and 2 illustrate land vehicle 10 having main frame 12 with vertical bearing 14 disposed near the front section thereof. Within vertical bearing 14 is steering shaft 16 which has steering bars 18 at the top end thereof and is secured to steering runner 20 by its opposite end. Alternately, steering runner 20 may appear as a ski, wheel or other related land traveling means suitable to steer land vehicle 10.

Journaled through bearing blocks 22 secured to main frame 12 is axle 24 with foot-crank peddles 26 and 28, respectively. Axle 24 is secured to sprocket drive wheel 30 which, by manual means, drives rear sprocket wheel 32 by chain 34. Rear sprocket wheel 32 is secured to rear axle 36, journaled through bearing blocks, not shown, and supported to main frame 12 where it is illustrated driving eccentric disposed wheels 38 and 40. Wheels 38 and 40 may be provided with teeth 42 or other ground-gripping means along a portion of the circumference of the rim, if desired, to facilitate gripping with the ground surface. Desirably, a portion of the circumference of the rim is free of teeth to avoid surface contact during coasting of the land vehicle.

Although eccentric disposed wheels 38 and 40 are illustrated as driven by manual means, it is recognized that any suitable power drive may be employed which drives the eccentric disposed wheels only upon command. In addition, the number of eccentric disposed wheels employed in any particular land vehicle, such as that illustrated in FIGS. 1 and 2 to include two eccentric disposed wheels, may include one or more depending upon the particular construction and traction desired.

Figures 3, 4, 5:
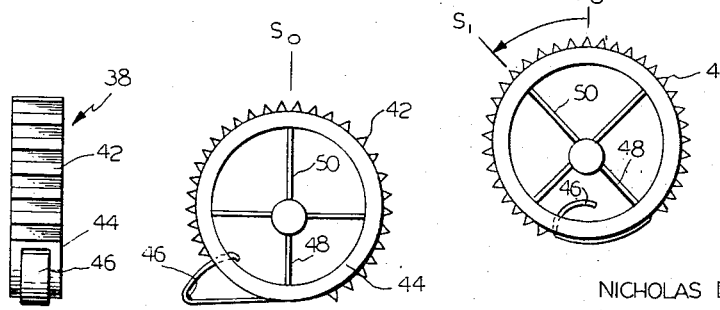
FIG. 3 is a front-elevational view of the new improved vehicle propelling wheel of the present invention.
FIG. 4 is a side-elevational view further illustrating the propelling wheel of FIG. 3.
FIG. 5 illustrates the propelling wheel of FIG. 4 as it progresses from coasting position into propelling position.

Eccentric disposed wheel 38 is more fully illustrated in FIGS. 3–5. At a convenient location within hub 44 and near the point where axle 36 is nearest the hub, is fixed ski spring 46 which is generally in ground contact during the coasting period of the land vehicle. The standard or normal position of wheel 38 appears in FIG. 4 with reference point $S_0$ at which point ski spring 46 is tangentially secured to the rim portion of the wheel and in ground contact. When it is desired to move the land vehicle past a surface obstruction, power is supplied to eccentric disposed wheel 38 causing it to turn to point $S_1$ of FIG. 5 at which point ski spring 46 is received, due to ground contact, within hub 44. As wheel 38 proceeds past point $S_1$, teeth 42 or other suitable ground-gripping means begin to grip the contact surface and because of the eccentric nature of the wheel, pressure increases between the wheel and the surface causing the vehicle to be pushed past the surface obstruction or irregularities. This process of wheel movement is continued for subsequent surface irregularities as desired.

Ski spring 46 is desirably formed of a flexible material such as flexible steel, although any other flexible metal may be employed as may non-metallic materials such as plastics or the like. The material useful for ski spring 46 need only be characterized as a long-wearing flexible material for use as part of the eccentric disposed wheel of this invention.

In order to clearly illustrate wheel 38, radial bars 48 and 50 present the relative distances useful to achieve the eccentric nature of the wheel for driving a land vehicle. For example, when the total length of radial bars 48 and 50 equal 8 units, the radial length of bar 48 may range from about 3¾ units down to about 2 units. When, for example, the circumference of hub 44 is about 25 units, the length of ski spring 46 within the circumference of hub 44 may vary from about 4 units along the circumference to about 12 units and more specifically, from about 7 units to about 10 units along the circumference of hub 44. Desirably, the circumference of hub 44 free of teeth 42 is slightly beyond the distance on either side covered by ski spring 46 to avoid ground contact until desired.

Land vehicle 10 may further include side runners 52 and 54 supported by braces 56 and intermediate cross bars 58 and 60 to main frame 12, with corresponding top cross bars 62 and 64 joining supporting bars 66 and 68; all of which bars comprise the associated frame structure of the vehicle. Vertical supports 70 may also be included to support bars 66 and 68 to frame 12 near the rear of the land vehicle. Attached to main frame 12 by triangularly disposed bars 72 and 74 is seat 76.

It is recognized that the particular construction of the land vehicle may be altered as may the ground support means illustrated as runners 20, 52 and 54, each of which may appear as a ski, wheel or like ground contact means.

Any means may be employed to drive the land vehicle with the eccentric wheel acting merely as an aid to forward the vehicle past land obstructions.

The most significant inclusion to any land vehicle is, of course, the eccentric disposed wheel illustrated by FIGS. 3–5. The land vehicles having the eccentric disposed wheel in place may be those designed for travel over dry land, sand, snow or ice as desired.

Various changes and modifications may appear in the previously described invention without departing from the spirit and scope as defined by the appended claims.

What is claimed is:

1. An eccentric disposed wheel about an axis which comprises, a rim, portion, an axle eccentrically disposed within said rim portion, and a flexible ski spring projecting tangentially from said rim portion near the closest point of the rim portion to said axle whereby upon rotation of the rim portion about the axle when the flexible ski spring is in ground contact, the ski spring conforms about the rim during initial rim-ground contact.

2. The eccentric wheel of claim 1 wherein surface gripping means project from the rim along the circumference along the major arc described by the circumference not occupied by the ski spring upon rotation of the wheel with ski spring ground contact.

3. The eccentric wheel of claim 2 wherein the length of the ski spring along the circumference of the rim is from about 4 units to about 12 units per each 25 units of circumference.

4. The eccentric wheel of claim 2 wherein the length of the ski spring along the circumference of the rim is from about 7 units to about 10 units per each 25 units of circumference.

5. A land vehicle comprising in combination, a frame, steering means having a ground contact member, said steering means secured to said frame for operation therewith, at least two ground contact members fixed for operation to said frame and oppositely disposed from said steering means, at least one eccentric disposed wheel of claim 1 mounted for operation to said frame and eccentric wheel propelling means in working relation with said eccentric wheel whereby the land vehicle may be moved over surface obstructions and irregularities.

6. The land vehicle of claim 5 wherein the ground contact members of the steering means and the oppositely disposed ground contact members are runners.

7. The land vehicle of claim 5 having means to support at least one occupant.

8. The land vehicle of claim 5 wherein two eccentric disposed wheels of claim 1 are employed with said land vehicle to aid the vehicle over surface obstructions and irregularities.

9. The land vehicle of claim 8 wherein the two eccentric disposed wheels are provided along a portion of the circumference of the rim with ground-gripping teeth.

References Cited

UNITED STATES PATENTS

| | | | |
|---|---|---|---|
| 330,786 | 11/1885 | Hussong | 280—12.14 |
| 725,857 | 4/1903 | Hamann | 280—12.12 |
| 1,156,069 | 10/1915 | Erickson | 301—51 |

BENJAMIN HERSH, *Primary Examiner.*

J. E. SIEGEL, *Assistant Examiner.*